March 8, 1932.  E. E. GAMON  1,848,419
WATER METER
Filed Dec. 28, 1929
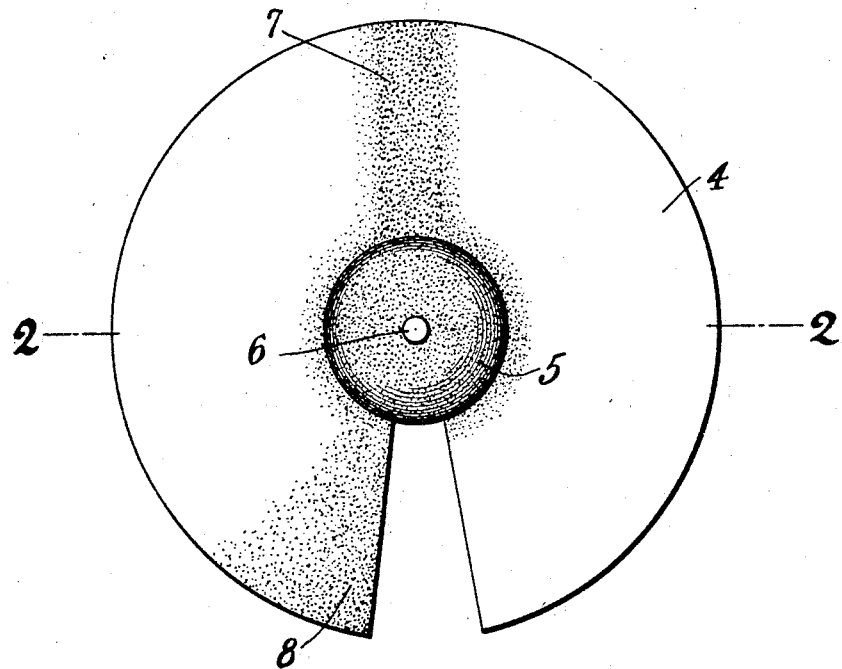
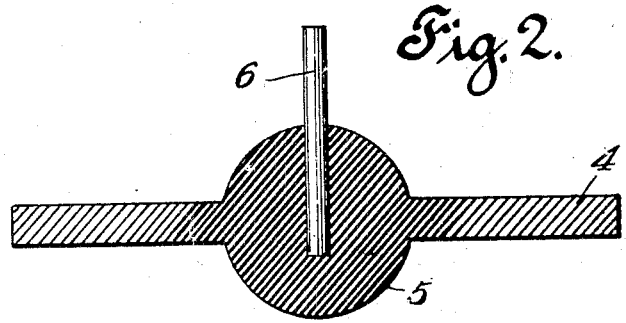
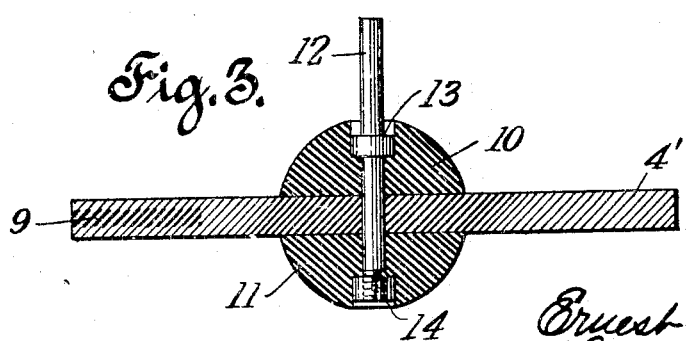
INVENTOR
Ernest E. Gamon
BY
Fredk. C. Fischer
ATTORNEY Patented Mar. 8, 1932

1,848,419

UNITED STATES PATENT OFFICE

ERNEST E. GAMON, OF PRINCE BAY, NEW YORK

WATER METER

Application filed December 28, 1929. Serial No. 417,129.

This invention relates to water meters and more particularly to means for preventing the cracking and breaking of disc pistons in such meters by sudden shocks. The usual water meter employed a disc piston made of hard rubber, phenol condensate product or the like. Now, material such as hard rubber and a phenol condensate product are brittle, and pistons made therefrom are cracked when subjected to the violent shocks caused by water hammer which frequently occurs in water meters.

Inasmuch as access to a disc piston is extremely inconvenient after a water meter has been installed in a water supply system it is obvious that a cracked or broken piston is a serious matter.

It is an object of this invention to provide a disc piston made substantially from relatively soft rubber whereby breakage from shocks is prevented, and its average accuracy increased.

A further object is the provision of a substantially soft rubber disk piston having selected areas vulcanized to hardness.

These and other objects are attained by the novel construction, combination and arrangement of parts hereinafter described and shown in the accompanying drawings, constituting a material part of this disclosure and in which:

Figure 1 represents a plan view of a substantially soft rubber disk piston having certain areas hardened.

Figure 2 represents a sectional view of the piston shown in Figure 1.

Figure 3 represents a sectional view of a piston having a hardened insert.

Referring to the drawings, a disk piston 4 is shown to have integral therewith a bearing sphere 5 in which is mounted a spindle 6, this structure being common and well known in disk pistons for water meters.

In order to prevent breakage of the piston due to shocks from water hammer and the like, the piston is made of a substantially soft rubber. However, since certain portions of the piston are subjected to wear and bearing pressure, it is desirable that such portions be hardened.

It is customary to drill a recess in the area 7 to support the shaft of a thrust roller; while the area 8 is subjected to rubbing friction. Consequently, it is necessary that such areas be hardened.

I have found by experiment that it is possible and practical to harden certain areas of a rubber piston by varying either the ingredients of the rubber mixture, or by varying the time of vulcanization. By proper treatment, the areas 7 and 8, for example, may be given all the characteristics of hard rubber, and selected portions of the disk may be given various degrees of toughness and hardness.

In Figure 3 is shown a disk piston 4' provided with a bearing sphere formed of the two parts 10 and 11, which are connected to the disk by means of a spindle 12, having an integral collar 13, and a nut 14 threaded to the lower extremity of the spindle.

It has been found practical to have the inside or center part of a soft rubber piston formed of a harder material; and in Figure 3 the disk 4' is made of relatively soft rubber with a hard insert 9 vulcanized therein, the insert 9 gradually decreasing in hardness into the relatively soft surface. This structure is desirable as it enables bearings to be made in the hard part 9 of the piston, and at the same time avoid breakage by shocks.

From the above description it will be seen that I have provided a disk piston of substantially soft rubber by means of which breakage from shocks will be prevented, at the same time the piston having selected areas vulcanized to hardness for bearing purposes.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. A disk piston for water meters, comprising a body of soft rubber having selected areas vulcanized to hardness.

2. A piston for water meters, comprising a disk of rubber having selected areas of varying degrees of toughness and hardness.

3. A piston for water meters, comprising a substantially soft rubber disk having a hardened internal portion gradually decreasing in hardness into the softer surrounding portions.

This specification signed this 14th day of November, 1929.

ERNEST E. GAMON.